US011151576B2

(12) United States Patent
Smith (10) Patent No.: US 11,151,576 B2
(45) Date of Patent: Oct. 19, 2021

(54) AUTHORIZING TRANSACTIONS USING NEGATIVE PIN MESSAGES

(71) Applicant: AT&T Intellectual Property I, L.P., Atlanta, GA (US)

(72) Inventor: Gary Smith, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 200 days.

(21) Appl. No.: 16/376,475

(22) Filed: Apr. 5, 2019

(65) Prior Publication Data

US 2020/0320538 A1    Oct. 8, 2020

(51) Int. Cl.
*G06Q 20/42*  (2012.01)
*G06Q 20/40*  (2012.01)
*G06Q 20/32*  (2012.01)

(52) U.S. Cl.
CPC ....... *G06Q 20/425* (2013.01); *G06Q 20/3255* (2013.01); *G06Q 20/407* (2013.01); *G06Q 20/4012* (2013.01); *G06Q 2220/00* (2013.01)

(58) Field of Classification Search
CPC ............. G06Q 20/425; G06Q 20/3255; G06Q 20/4012; G06Q 20/407
See application file for complete search history.

(56) References Cited

U.S. PATENT DOCUMENTS

| | | | |
|---|---|---|---|
| 5,668,876 A | 9/1997 | Falk et al. | |
| 7,707,108 B2 | 4/2010 | Brown et al. | |
| 7,848,522 B2 | 12/2010 | Haverinen | |
| 8,479,288 B2 | 7/2013 | Martin et al. | |
| 8,914,643 B2 | 12/2014 | Isshiki | |
| 9,027,126 B2 | 5/2015 | Larkins | |
| 9,047,473 B2 | 6/2015 | Samuelsson et al. | |
| 9,098,678 B2 | 8/2015 | Hao et al. | |
| 9,210,183 B2 | 12/2015 | Sadovsky et al. | |
| 9,439,070 B2 | 9/2016 | Sugiyama et al. | |
| 9,704,161 B1 | 7/2017 | Oates et al. | |
| 9,886,693 B2 | 2/2018 | Song et al. | |

(Continued)

FOREIGN PATENT DOCUMENTS

| | | | | |
|---|---|---|---|---|
| EP | 1107149 | * | 6/2001 | ............. G06Q 40/02 |
| WO | 2004012118 | | 2/2004 | |

(Continued)

OTHER PUBLICATIONS

Generate a temporary Support PIN, Apple, available online at support.apple.com, Sep. 18, 2018, 2 pages.

*Primary Examiner* — Patrick McAtee
*Assistant Examiner* — Terry Nathan Murray
(74) *Attorney, Agent, or Firm* — Guntin & Gust, PLC; Douglas Schnabel (57) ABSTRACT

A method for authenticating a transaction includes: receiving, by a transaction processing unit of a computing system, a request for a transaction on a user account; generating, by the transaction processing unit, a personal identification number (PIN) and/or alert message; transmitting the PIN to a mobile device associated with the user account after a person requesting the transaction refuses authentication by a PIN-to-device process; and canceling, by the transaction processing unit, the transaction when a response to the PIN and/or alert message is received from the mobile device within a specified period of time.

20 Claims, 4 Drawing Sheets

(56) References Cited

U.S. PATENT DOCUMENTS

| | | |
|---|---|---|
| 9,900,309 B2 | 2/2018 | Toth |
| 9,912,692 B1 | 3/2018 | Fleyder et al. |
| 9,912,695 B1 | 3/2018 | Chao et al. |
| 10,142,343 B2 | 11/2018 | Akiyama et al. |
| 2011/0281630 A1 | 11/2011 | Omar |
| 2012/0089518 A1 | 4/2012 | Blonchek |
| 2013/0173465 A1 | 7/2013 | Talimaa et al. |
| 2013/0263226 A1 | 10/2013 | Sudia |
| 2014/0156535 A1 | 6/2014 | Jabbour et al. |
| 2015/0095206 A1* | 4/2015 | Van Heerden ......... G06Q 40/00 705/35 |
| 2016/0104155 A1* | 4/2016 | Mcgaugh ............. G06Q 20/401 705/65 |
| 2016/0148488 A1* | 5/2016 | Tijerina ............... G06Q 50/265 705/325 |
| 2017/0142112 A1* | 5/2017 | Stevens ................. H04W 12/06 |
| 2018/0047009 A1* | 2/2018 | Ayyagari .............. G06Q 20/322 |
| 2018/0293584 A1 | 10/2018 | Maheshwari et al. |
| 2020/0286093 A1* | 9/2020 | Agrawal ................ G06Q 20/22 |
| 2020/0302446 A1* | 9/2020 | Kledaras ............ G06Q 20/4016 |

FOREIGN PATENT DOCUMENTS

| | | |
|---|---|---|
| WO | 2006022513 | 3/2006 |
| WO | 2011021868 | 6/2011 |
| WO | 2016083987 | 6/2016 |
| WO | 2016164648 | 10/2016 |

\* cited by examiner

AUTHORIZING TRANSACTIONS USING NEGATIVE PIN MESSAGES

BACKGROUND

Unless otherwise indicated herein, the materials described in this section are not prior art to the claims in this application and are not admitted to be prior art by inclusion in this section.

Two-factor authentication, for example, personal identification number (PIN)-to-device authentication, has been used to verify the identity of a person attempting to perform a transaction. Out-of-band authentication is a type of two-factor authentication that requires a secondary verification method through a separate communication channel.

For example, a customer may initiate a telephone transaction with a store. To verify the identity of the customer, a customer service representative may request information from the customer that only the customer and the store should know, for example, a verbal answer to a security question (the first factor). The customer service representative may then cause a code, for example a PIN, to be generated and communicated by a transaction system as a text message to a telephone number of a mobile device that was previously registered with the store by the customer (the second factor). The customer then reads the code back to the customer service representative, and if the code read back by the customer matches the code generated and sent by the system, the transaction proceeds. If the codes do not match, the transaction may be canceled or refused, or another method of authentication required.

In some cases, a person may be attempting to commit fraud, for example, on a wireless account to obtain a wireless device or to take over an account to commit other types of fraud such as financial fraud on a bank. The fraudster may represent to the wireless company or bank that the registered phone has been lost, stolen, or damaged, and therefore sending a PIN to the mobile device would be useless. However, the fraudster may possess enough information about the true owner of the account to validate themselves and convince the wireless company or bank to proceed with the fraudulent transaction.

SUMMARY

Systems and methods for sending a numeric PIN and/or alert message to a customer device to identify an attempt to commit fraud are provided. The response to the message and the message itself may be different than the message and PIN that is sent when the customer agrees to accept a PIN-to-device as an acceptable identification method. In the fraud case, where the purported customer indicates that a PIN-to-device identification cannot be used for any reason, the message sent by the system may say, for example, "Someone is attempting to complete a transaction on your account, if this is not you, please respond with STOP."

According to various aspects there is provided a method. In some aspects, the method may include: receiving, by a transaction processing unit of a computing system, a request for a transaction on a user account; generating, by the transaction processing unit, a personal identification number (PIN) and/or alert message; transmitting the PIN and/or alert message to a mobile device associated with the user account after a person requesting the transaction refuses authentication by a PIN-to-device process; and canceling, by the transaction processing unit, the transaction when a response to the PIN and/or alert message is received from the mobile device within a specified period of time that can be customized to the transaction and/or channel (e.g. contact center, retail store) the transaction is taking place in. The PIN and/or alert message may be transmitted to the mobile device associated with a user account via short message service (SMS) or push notification.

The method may further include proceeding with the transaction when the response to the PIN and/or alert message is not received from the mobile device within the specified period of time. The specified period of time may be determined based on a transaction channel through which the request for the transaction is initiated. The transaction channel may be a retail transaction channel, an online transaction channel, or a contact center transaction channel. The specified period of time may be an amount of time less than a time for completing the transaction. The transaction processing unit may route the response to the PIN and/or alert message received from the mobile device to a transaction processing system to cancel the transaction.

According to various aspects there is provided a system in some aspects, the system may include: a computing device and a transaction processing system. The transaction processing system configured to receive, via the computing device, a request for a transaction on a user account; generate a personal identification number (PIN) and/or alert message; transmit the PIN and/or alert message to a mobile device associated with the user account after a person requesting the transaction refuses authentication by a PIN-to-device process; and cancel the transaction when a response to the PIN and/or alert message is received from the mobile device within a specified period of time. The PIN and/or alert message may be transmitted to the mobile device associated with a user account via short message service (SMS) or push notification.

The transaction processing system may be further configured to proceed with the transaction when the response to the PIN is not received from the mobile device within the specified period of time. The specified period of time may be determined based on a transaction channel through which the request for the transaction is initiated. The transaction channel may be one of a retail transaction channel, an online transaction channel, or a contact center transaction channel. The specified period of time may be an amount of time less than a time for completing the transaction.

The computing device may include a transaction processing unit, and the transaction processing unit may route the response to the PIN and/or alert message received from the mobile device to the transaction processing system to cancel the transaction.

According to various aspects there is provided a non-transitory computer readable medium. In some aspects, the non-transitory computer readable medium may include instructions for causing one or more processors to perform operations including: receiving a request for a transaction on a user account; generating a personal identification number (PIN) and/or alert message; transmitting the PIN and/or alert message to a mobile device associated with the user account after a person requesting the transaction refuses authentication by a PIN-to-device process; and canceling or refusing to complete the transaction when a response to the PIN is received from the mobile device within a specified period of time.

The operations may further include proceeding with the transaction when the response to the PIN is not received from the mobile device within the specified period of time. The specified period of time may be determined based on a transaction channel through which the request for the transaction is initiated. The operations may further include determining that the request for the transaction is initiated through a retail transaction channel, an online transaction channel, or a contact center transaction channel. In some cases the specified period of time may be an amount of time less than a time for completing the transaction.

The operations may further include routing the response to the PIN and/or alert message received from the mobile device to a transaction processing system to cancel the transaction Numerous benefits are achieved by way of the various embodiments over conventional techniques. For example, the various embodiments use a process of sending a numeric PIN to a customer device to identify an attempt to commit fraud. The various embodiments provide methods and systems for sending a PIN and/or alert message to a still active and functioning mobile device of an account holder that alerts the account holder that a fraudulent transaction is being attempted by an imposter representing that the mobile device is lost, stolen, or damaged. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The process of sending a numeric or alphanumeric PIN to a customer mobile device, also referred to herein as PIN-to-device, may be a part of an authentication process to validate the identity of a person. The PIN-to-device process sends a one-time PIN to a mobile device that is registered with a wireless service provider for the account holder or authorized user on the account on which the transaction is being executed. If the account holder or authorized user lost the mobile device, if the mobile device has been stolen, or if the mobile device is damaged, they will be unable to receive the PIN. Since the mobile device is missing, a PIN-to-device will not be sent to authenticate the account holder since it will be assumed that the PIN will not be received. In such cases, an alternative authentication method, for example, an account passcode or driver's license, may be used for identification. However, the alternative authentication may have been compromised, for example, a counterfeit driver's license and/or account password may have been illegally obtained. The person requesting the transaction may be an imposter attempting to commit fraud by falsely representing that the device is lost, stolen or damaged while the true account holder or authorized user still has the active mobile device.

In accordance with various aspects of the present disclosure, a negative PIN-to-device process may be used to identify an attempt to commit fraud on an account, for example, a mobile device account or other account. The PIN and/or an alert message may be generated and transmitted to the mobile device even though a customer represented that the mobile device was lost, stolen, or damaged. Sending the PIN-to-device when the customer represents that the mobile device was lost, stolen, or damaged is referred to herein as a negative PIN-to-device. When the mobile device is actually lost, stolen, or damaged, the account holder/authorized user cannot access the mobile device to respond to the negative PIN-to-device. However, a response to a negative PIN-to-device may be received from the true owner in possession of the mobile device when a transaction is attempted by an imposter that fraudulently represents that the mobile device is lost, stolen, or damaged.

In the fraudulent case, the negative PIN-to-device would be transmitted, for example, by short message service (SMS), push notification, or another notification method known in the art, to an active and functioning mobile device in the possession of the true account holder and would alert the true account holder to the fact that a fraudulent transaction, for example, but not limited to, upgrading a service, adding a phone line, obtaining a replacement device, swapping a subscriber identity module (SIM) of the true account holder to a mobile device of a fraudster, etc., was being attempted on their account. The true account holder may then contact the sender, for example, by responding to the PIN and/or alert message via text that the transaction is not authorized, calling a fraud prevention phone number, etc.

When the response that the transaction is not authorized is received from the true owner of the mobile device within a specified period of time, the transaction may be identified as fraudulent and the fraudulent transaction may be canceled or refused. The fraud may be prevented or the scheme may be detected early and its impact limited. Thus, incorporating the process of sending a negative PIN-to-device to the mobile device in question regardless of the expectation of receiving no response provides benefits in identifying fraudulent transactions.

Figure 1:
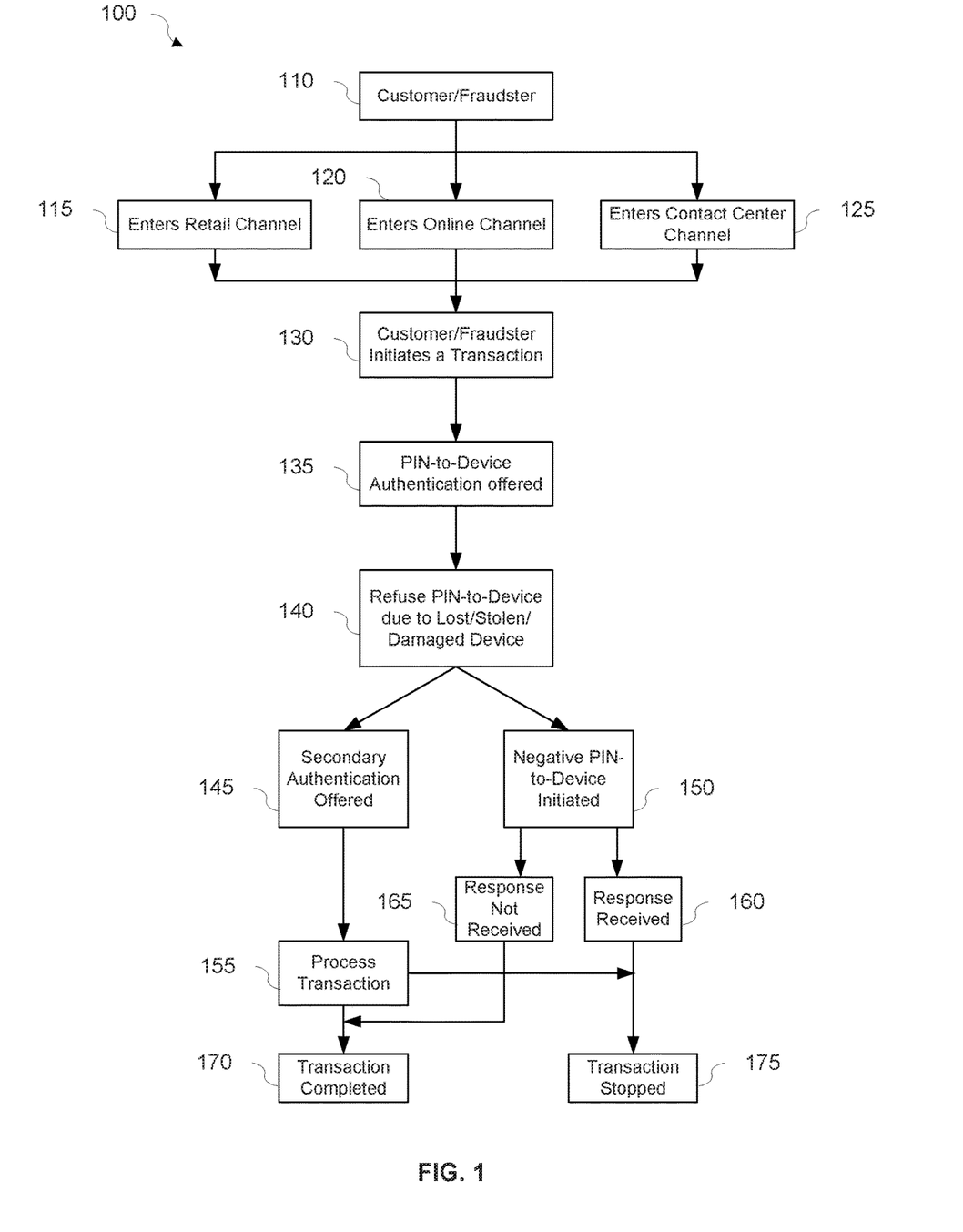
FIG. 1 is block diagram of an example system flow for transactions through various ordering channels according to various aspects of the present disclosure.

FIG. 1 is block diagram of an example system flow 100 for transactions through various ordering channels according to various aspects of the present disclosure. Referring to FIG. 1, at block 110, an authorized customer or a fraudster may determine to initiate a transaction through a transaction channel. In some cases, the transaction channel may be a retail channel (block 115), for example, a retail store or other face-to-face establishment. In some cases, the transaction channel may be an online ordering channel (block 120), for example, a company website or other online retailer website. In other cases, the transaction channel may be a contact center (block 125), for example, a telephone contact center of a wireless service provider for the mobile device. One of ordinary skill in the art will appreciate that these transaction channels are exemplary and that other variations and alternatives may exist and are contemplated as coming within the scope of the present disclosure.

At block 130, the customer or fraudster may initiate a transaction through the transaction channel. The transaction may be initiated by inputting information into a computing system. The computing system may include a computing device having a transaction processing unit configured to receive the information and communicate with a transaction processing system. The transaction processing system may capture order data (e.g., sales data) from customer service employees or directly from customers (e.g., for online orders). The transaction processing system may send order information to accounting and shipping departments to fulfill the order.

The transaction may be, for example, but not limited to, upgrading a service, adding a phone line, obtaining a replacement device, swapping a SIM to a different mobile device, etc. At block 135, PIN-to-device authentication may be offered to authenticate the transaction. For example, a customer service representative at a retail store or contact center may offer to send a PIN to the mobile device registered, or associated, with the customer account, or a website may prompt for a telephone number for the mobile device associated with the customer account.

At block 140, the customer/fraudster may refuse the PIN-to-device authentication. In the case of the customer, for example, the true account holder or authorized user, the PIN-to-device authentication may be refused because the mobile device is missing (e.g., lost, stolen, or damaged). The fraudster, however, may deceptively represent that the mobile device is missing. At block 145, a secondary authentication method, for example, a driver's license or account passcode, may be offered to the customer/fraudster. The true account holder may produce authentic identification, while the fraudster may produce counterfeit identification falsely identifying the fraudster as the true account holder.

Concurrently with the offer of a secondary authentication method, at block 150, a negative PIN-to-device process may be initiated in which a PIN and/or alert message is generated and transmitted to the mobile device that was represented as missing. An alert message may be, for example, "Someone is attempting to complete a transaction on your account, if this is not you, please respond with STOP." At block 155, processing of the transaction may begin. The time required to process the transaction may vary depending on the transaction channel. For example, a transaction through a retail channel (e.g., a face-to-face transaction in a retail store) may take an hour or less to complete, while a transaction through an online channel or contact center channel may take on the order of 24 hours before the transaction is complete (e.g., a new mobile device is shipped). In some cases, an order may be held for a predetermined amount of time before completing the transaction. The predetermined amount of time may provide additional time to receive a response to the negative PIN-to-device transmitted to the mobile device.

At block 160, a response to the negative PIN-to-device transmitted to the mobile device may be received. The response to the negative PIN-to-device may be an indication that the mobile device represented as missing is active and in the possession of the true account holder. Therefore, the person initiating the transaction may be an imposter/fraudster. If the response to the negative PIN-to-device is received while the transaction is still being processed, at block 175, the transaction may be stopped.

On the other hand, at block 165, a response to the negative PIN-to-device may not be received while the transaction is still being processed. The lack of a response to the negative PIN-to-device may be an indication that the mobile device associated with the account is truly missing and that the person initiating the transaction may be the true account holder. In that case, at block 170, the transaction may be completed.

Figure 2:
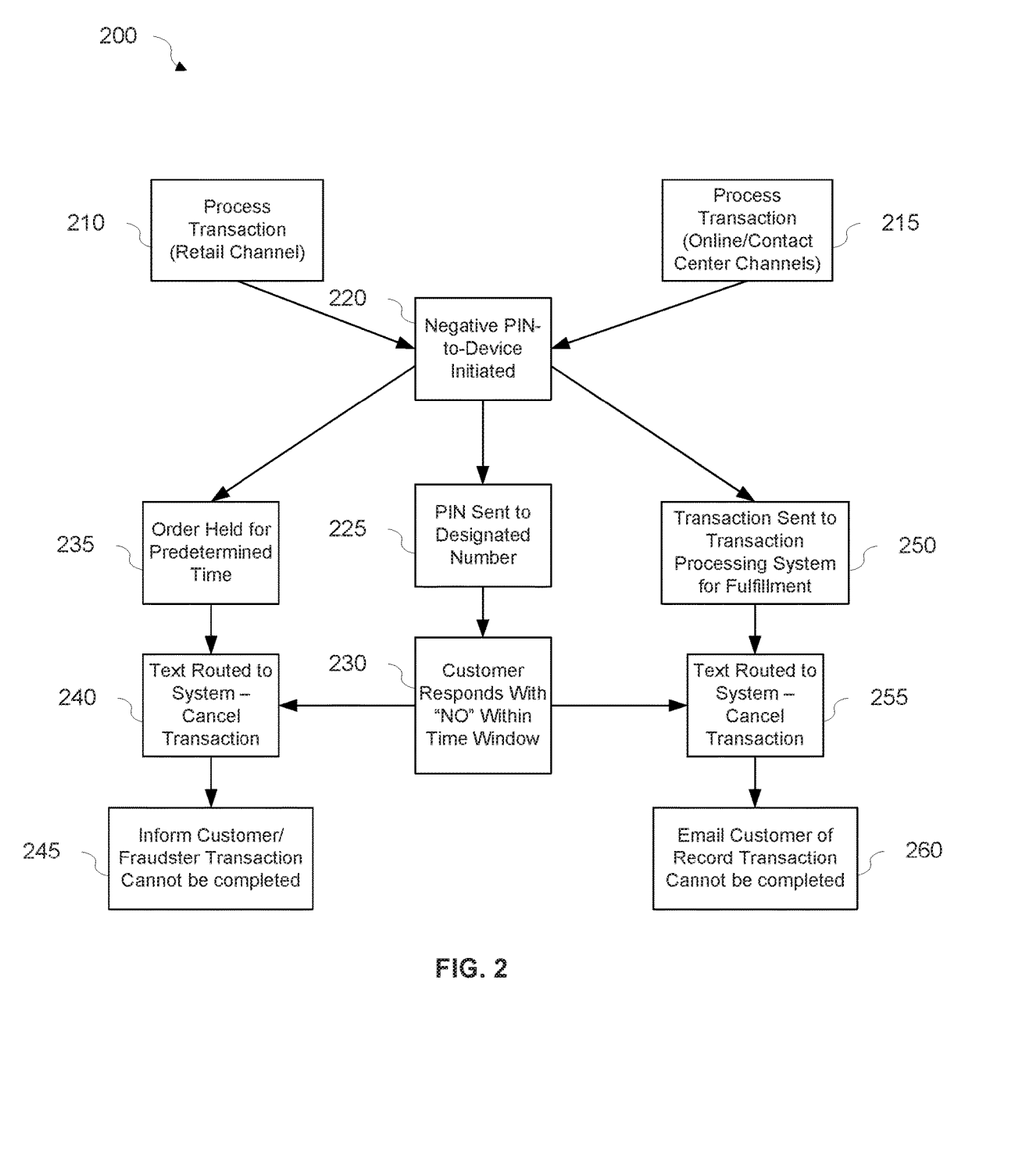
FIG. 2 is block diagram of an example system flow for processing negative PIN-to-device responses of indicating a fraudulent transaction according to various aspects of the present disclosure.

FIG. 2 is block diagram of an example system flow 200 for processing negative PIN-to-device responses indicating a fraudulent transaction according to various aspects of the present disclosure. Referring to FIG. 2, a transaction on an account, for example, a mobile device account, initiated by a fraudster/imposter may begin processing. For example, at block 210, the transaction may begin processing through a retail channel. The retail channel may be, for example, a retail store or other face-to-face establishment. Alternatively, at block 215, the transaction may begin processing through an online channel (e.g., a company website or other online retailer website) or contact center channel (e.g., a telephone contact center of a wireless service provider). The transaction may be, for example, but not limited to, upgrading a service, adding a phone line, obtaining a replacement device, swapping a SIM to a different mobile device, etc.

At block 220, after the transaction has been initiated, a negative PIN-to-device process may be initiated in which a PIN and/or alert message is generated and transmitted to the mobile device registered, or associated, with the account. For example, the PIN and/or alert message may be generated by a computing device in a computing environment associated with the mobile device service provider. The computing device may be in communication with a transaction processing system. The transaction processing system may capture order data (e.g., sales data) from customer service employees or directly from customers (e.g., for online orders). The transaction processing system may send order information to accounting and shipping departments to fulfill the order. At block 225, the PIN and/or alert message may be transmitted to a designated telephone number of a mobile device associated with the account and registered with the service provider. For example, the computing device may cause the PIN and/or alert message to be transmitted to the mobile device by, for example, SMS, push notification, or another method.

Concurrently, when the transaction is entered through the retail channel, at block 235, completion of the order may be held for a predetermined amount of time, for example, 30 minutes or another amount of time. For example, a transaction processing system may be configured to hold processing the transaction for the predetermined amount of time. In some cases, the customer service employees may be trained to delay processing of certain transactions when fraud is suspected. In some implementations, the transaction may require a specific input related to the negative PIN-to-device process to proceed or be canceled. For example, a customer service employee may input an authorization code to the computing system or a text response to the negative PIN-to-device may be received and routed to the transaction processing system. One of ordinary skill in the art will appreciate that other methods of delaying the processing of a transaction may be used without departing from the scope of the present disclosure.

At block 230, a response to the negative PIN-to-device may be received by the service provider within the predetermined period of time that completion of the transaction is delayed. For example, a true account holder in possession of a mobile device represented as missing by an imposter/fraudster may respond to the negative PIN-to-device within the period of time that completion of the transaction is delayed. The response indicates that the mobile device is not missing and is in possession of the true account holder; therefore, the person attempting the transaction may be attempting to commit fraud. At block 240, the text response may be routed to the transaction processing system, and the transaction processing system may cancel the transaction. Alternatively or additionally, the text response may be routed to a computing device of a customer service employee and the customer service employee may cancel the transaction. At block 245, the imposter/fraudster may be informed, for example by the customer service employee, or by text message, email, etc., generated by the transaction processing system that the transaction cannot be completed.

Similar to the retail channel, when a transaction initiated by a fraudster/imposter begins processing through an online channel or a contact center channel (block 215), at block 220, a negative PIN-to-device process may be initiated in which a PIN and/or alert message is generated and transmitted to the mobile device associated with the account. At block 225, the PIN and/or alert message may be transmitted to a designated telephone number of a mobile device registered with the service provider.

At block 250, the transaction information may be forwarded to a transaction processing system to fulfill the order. Since the transaction is an online or telephone transaction, order fulfillment may experience a normal delay, for example, 24 hours or another period of time, between the time the fraudsters/imposter initiates the transaction and the time the transaction is completed (e.g., a replacement mobile device is shipped). At block 230, a response to the negative PIN-to-device may be received by the service provider within the time period that it takes for completion of the transaction. For example, a true account holder in possession of a mobile device represented as missing by an imposter/fraudster may respond to the negative PIN-to-device within the time period that it takes for completion of the transaction. The response indicates that the mobile device is not missing and is in possession of the true account holder; therefore, the person attempting the transaction may be a fraudster attempting to commit fraud.

At block 255, the text response may be routed to the transaction processing system, and the transaction processing system may cancel the transaction. At block 260, an email or a text message may be sent to the true account holder of record that the transaction cannot be completed. For example, the transaction processing system may generate an email or a text message to the true account holder informing the true account holder that the transaction initiated by the fraudster cannot be completed.

Figure 3:
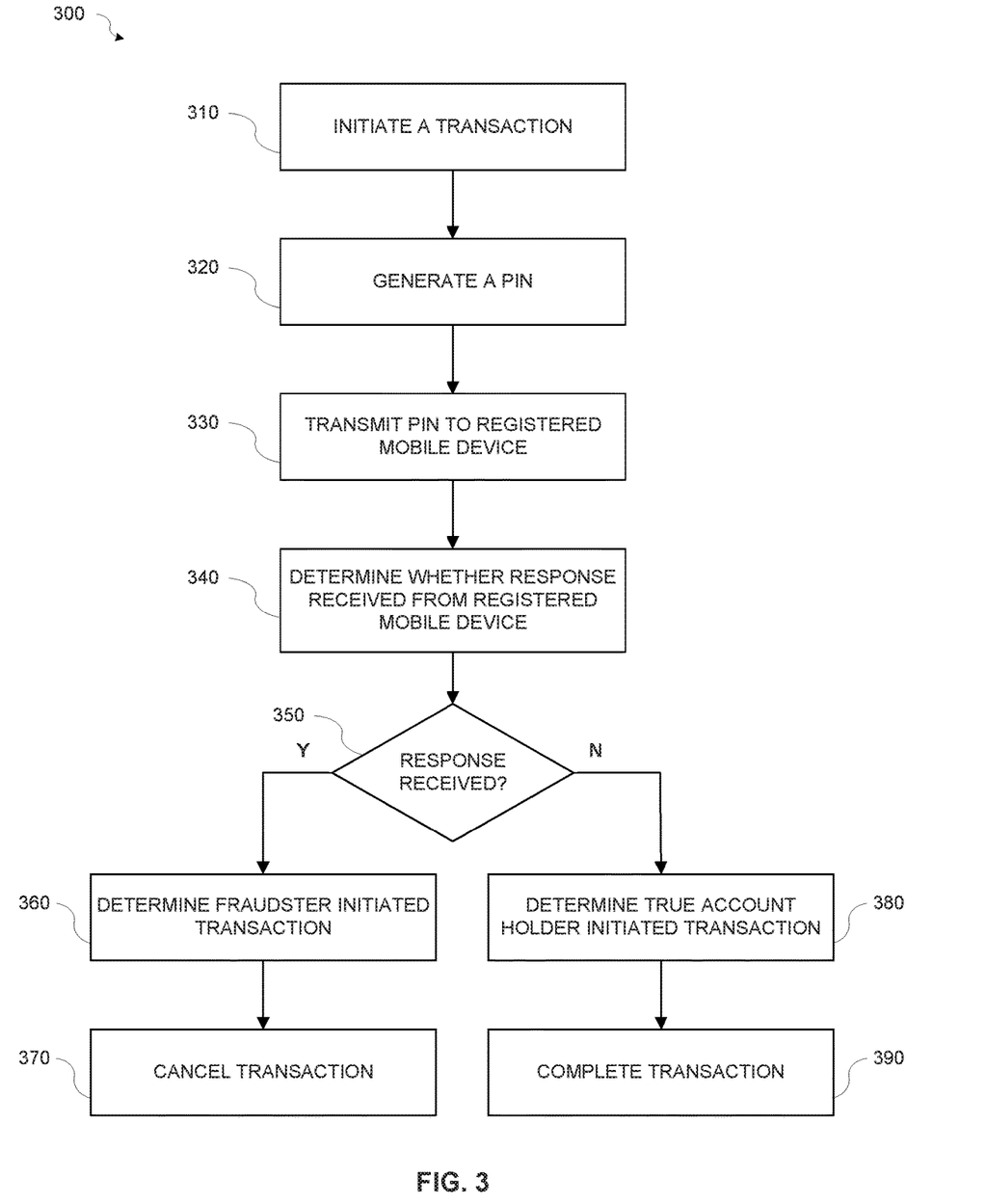
FIG. 3 is a flowchart illustrating an example method for authenticating a transaction using a negative PIN-to-device process according to various aspects of the present disclosure.

FIG. 3 is a flowchart illustrating an example method 300 for authenticating a transaction using a negative PIN-to-device process according to various aspects of the present disclosure. Referring to FIG. 3, at block 310, a transaction may be initiated. A transaction, for example, upgrading a service, adding a phone line, obtaining a replacement device, swapping a SIM to a different mobile device, etc., on an account may be initiated either by a true account holder or a fraudster. The transaction may be initiated through various channels, for example, at a retail store, online, or via a contact center. Initiating the transaction may include inputting information into a computing system including a computing device having a transaction processing unit configured to receive the information and communicate with a transaction processing system. When initiating the transaction, the account holder/fraudster may represent that the mobile device registered, or associated, with the account is unavailable (e.g., lost, stolen, damaged, etc.). In such cases, secondary authentication may be required.

At block 320, when an account holder/fraudster represents that the mobile device registered with the account is missing, a negative PIN-to-device may be generated. For example, information regarding the account, including information indicating that the registered mobile device is missing, may be entered into a computing system that is in communication with a transaction processing system. In response to the information indicating that the registered mobile device is missing, the computing system or transaction processing system may automatically generate the negative PIN-to-device. In some implementations, the computing system or transaction processing system may receive an instruction from a user, for example, a customer service employee, to generate the negative PIN-to-device.

At block 330, the PIN and/or alert message may be transmitted to the registered mobile device. For example, the computing system or transaction processing system may automatically transmit the generated PIN and/or alert message to the mobile device registered to the account indicated by the account holder or fraudster. In some implementations, the computing system or transaction processing system may receive an instruction from a user to transmit the negative PIN-to-device.

At block 340, it may be determined whether a response to the negative PIN-to-device is received from the registered mobile device within a predetermined time period during which completion of the transaction may normally take or be delayed. For example, for a face-to-face transaction at a retail store, completion of the transaction may be delayed for 30 minutes or another time period, while completion of the transaction may be delayed for 24 hours or another period of time typically required for online or telephone order fulfillment through a transaction processing system.

In response to determining that a response to the negative PIN-to-device indicating that the transaction is not authorized is received (350-Y) while the transaction is in process, at block 360 it may be determined that the true account holder is in possession of the mobile device represented as missing and that the transaction was initiated by a fraudster. At block 370 the transaction initiated by the fraudster may be canceled. For example, the text response may be routed to a transaction processing system, and the transaction processing system may cancel the transaction. Alternatively or additionally, the text response may be routed to a computing device of a customer service employee and the customer service employee may cancel the transaction. The true account holder may be notified, for example, via text message or email, that an attempted transaction was canceled. In response to determining that a response to the negative PIN-to-device is not received (350-N), at block 380 it may be determined that the person initiating the transaction is the true account holder since the mobile device may actually be missing. In this case, however, the person initiating the transaction may still be a fraudster and the true account holder may not have seen the message in time to respond to it. Therefore, at block 390, the transaction may be completed.

It should be appreciated that the specific steps illustrated in FIG. 3 provide a particular method for authenticating a transaction according to an embodiment. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

The method 300 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The negative PIN-to-device improves on other methods of customer authentication as often fraudsters know and are therefore able to compromise the fallback authentication methods typically in use in the case of lost, stolen or damaged devices. For example, a "NO" response by a customer to a text alerting the customer and asking if a transaction was valid could be tied directly into the sales and ordering system to stop the transaction if it is not yet complete (e.g., a person in a store where the fraudster walks out with the device) or if it has not yet shipped (e.g., an over the phone or online order to be processed and shipped).

One of ordinary skill in the art will appreciate that while various aspects of the negative PIN-to-device implementations have been described with respect to attempted fraud committed with respect to mobile device service providers, mobile devices and mobile device services, embodiments consistent with the present disclosure are not limited to these implementations. For example, embodiments in accordance with the present disclosure have applications in other areas where secondary authentication is used but may be compromised, for example, but not limited to, banking or other financial transactions. One of ordinary skill in the art would recognize many other implementations.

Figure 4:
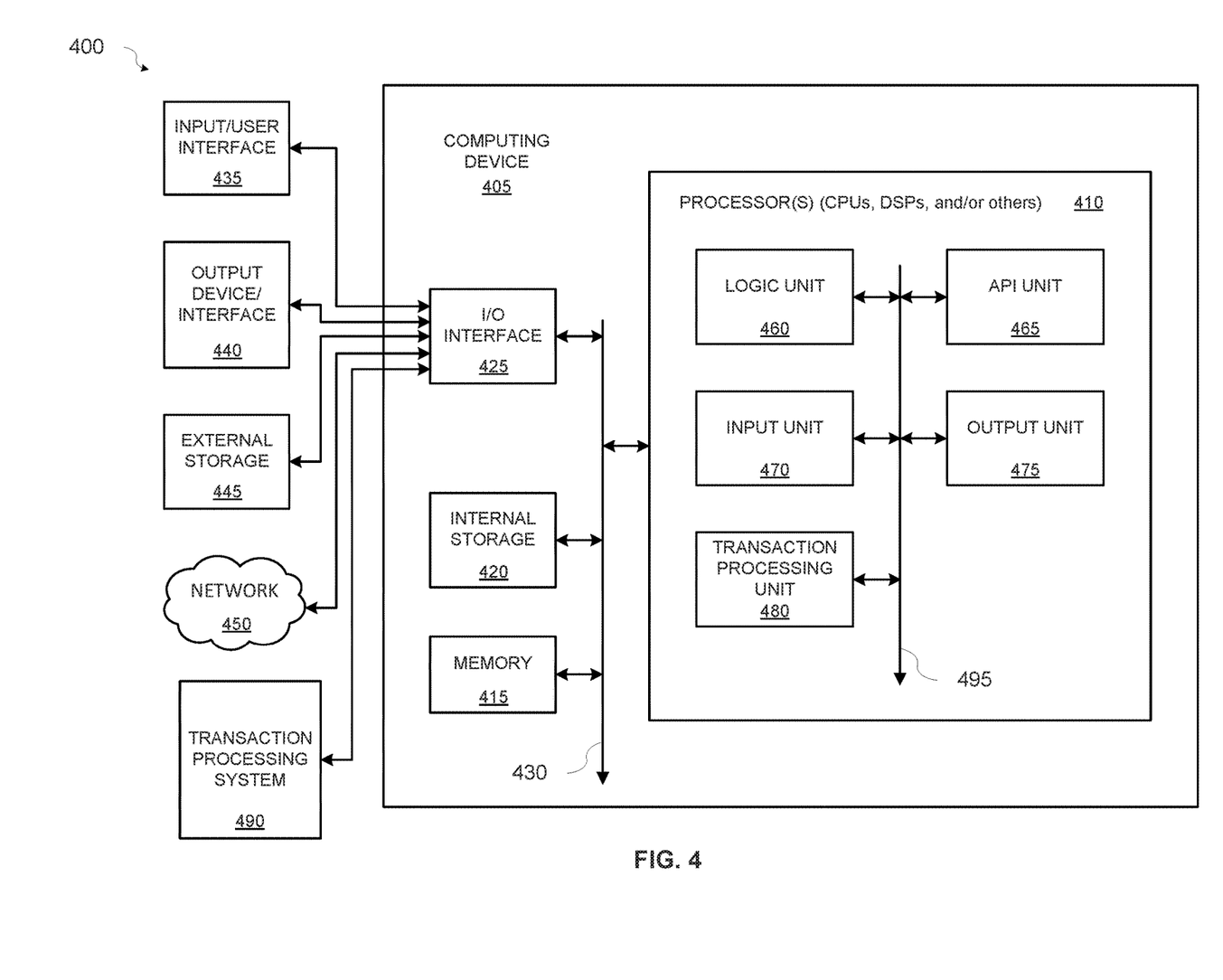
FIG. 4 is a block diagram of an example computing environment with an example computing device suitable for use in some example implementations.

FIG. 4 is a block diagram of an example computing environment 400 with an example computing device suitable for use in some example implementations. The computing device 405 in the computing environment 400 may include one or more processing units, cores, or processors 410, memory 415 (e.g., RAM, ROM, and/or the like), internal storage 420 (e.g., magnetic, optical, solid state storage, and/or organic), and/or I/O interface 425, any of which may be coupled on a communication mechanism or a bus 430 for communicating information or embedded in the computing device 405.

The computing device 405 may be communicatively coupled to an input/user interface 435 and an output device/interface 440. Either one or both of the input/user interface 435 and the output device/interface 440 may be a wired or wireless interface and may be detachable. The input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). The output device/interface 440 may include a display, television, monitor, printer, speaker, braille, or the like. In some example implementations, the input/user interface 435 and the output device/interface 440 may be embedded with or physically coupled to the computing device 405. In other example implementations, other computing devices may function as or provide the functions of the input/user interface 435 and the output device/interface 440 for the computing device 405.

Examples of the computing device 405 may include, but are not limited to, mobile devices (e.g., tablets, notebooks, laptops, personal computers, portable televisions, radios, and the like), and devices not designed for mobility (e.g., desktop computers, other computers, information kiosks, and the like).

The computing device 405 may be communicatively coupled (e.g., via the I/O interface 425) to an external storage device 445, a network 450 for communicating with any number of networked components, devices, and systems, including one or more computing devices of the same or different configuration, and a transaction processing system 490. In some implementations, the computing device 405 may be communicatively coupled to the transaction processing system 490 via the network 450. The computing device 405 or any connected computing device may be functioning as, providing services of, or referred to as a server, client, thin server, general machine, special-purpose machine, or another label.

The I/O interface 425 may include, but is not limited to, wired and/or wireless interfaces using any communication or I/O protocols or standards (e.g., Ethernet, 802.11$x$, Universal System Bus, WiMax, modem, a cellular network protocol, and the like) for communicating information to and/or from at least all the connected components, devices, and network in the computing environment 400. The network 450 may be any network or combination of networks (e.g., the Internet, local area network, wide area network, a telephonic network, a cellular network, satellite network, and the like).

The computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computing device 405 can be used to implement techniques, methods, applications, processes, or computer-executable instructions in some example computing environments. Computer-executable instructions can be retrieved from transitory media and stored on and retrieved from non-transitory media. The executable instructions may originate from one or more of any programming, scripting, and machine languages (e.g., C, C++, C #, Java, Visual Basic, Python, Perl, JavaScript, and others).

The processor(s) 410 may execute under any operating system (OS) (not shown), in a native or virtual environment. One or more applications may be deployed that a include logic unit 460, an application programming interface (API) unit 465, an input unit 470, an output unit 475, a transaction processing unit 480, and an inter-unit communication mechanism 495 for the different units to communicate with each other, with the OS, and with other applications (not shown). For example, the transaction processing unit 480 may implement one or more processes described and/or shown in FIGS. 1, 2, and 3. The described units and elements can be varied in design, function, configuration, or implementation and are not limited to the descriptions provided.

In some example implementations, when information or an execution instruction is received by the API unit 465, it may be communicated to one or more other units (e.g., the logic unit 460, the input unit 470, the output unit 475, and the transaction processing unit 480). For example, after the input unit 470 has detected a user indication, the input unit 470 may use the API unit 465 to communicate the user indication to the transaction processing unit 480. The transaction processing unit 480 may, via the API unit 465, interact with the output unit 475 to communicate information (e.g., via the I/O interface 425) to the transaction processing system 490. The transaction processing system 490 may capture order data from customer service employees or from customers directly, for example via the input/user interface 435 and the transaction processing unit 480, store the data in a central database (not shown) and send order information to accounting and shipping departments, for example via the network 450, if applicable. The transaction processing system 490 may also provide tracking data on orders and inventory.

In some instances, the logic unit 460 may be configured to control the information flow among the units and direct the services provided by the API unit 465, the input unit 470, the output unit 475, and the transaction processing unit 480 in some example implementations described above. For example, the flow of one or more processes or implementations may be controlled by the logic unit 460 alone or in conjunction with the API unit 465.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for authenticating a transaction, the method comprising:
  receiving, by a processing system including a processor, a request from a transaction processing system for a transaction associated with a user account of a communication service provider, wherein the user account is associated with a communication device;
  transmitting, by the processing system, a prompt to the transaction processing system to perform an authentication step for the transaction, wherein the authentication step requires access to the communication device associated with the user account;
  receiving, by the processing system, an indication from the transaction processing system that the communication device associated with the user account is not available for the authentication step due to being lost or stolen; and
  responsive to the receiving the indication that the communication device associated with the user account is not available for the authentication step due to being lost or stolen:
    transmitting, by the processing system, an alert message to the communication device associated with the user account, wherein the alert message includes a personal identification number (PIN);
    monitoring, by the processing system, for a response message from the communication device associated with the user account;
    determining, by the processing system, whether the response message from the communication device associated with the account is received within a time period and includes the PIN;
    canceling, by the processing system, the transaction responsive to the determining that the response message from the communication device associated with the user account is received within the time period and includes the PIN; and
    completing, by the processing system, the transaction responsive to the determining that the response message from the communication device associated with the user account is not received within the time period or does not include the PIN.

2. The method of claim 1, further comprising generating, by the processing system, the PIN responsive to the receiving the indication that the communication device associated with the user account is not available for the authentication due to being lost or stolen.

3. The method of claim 1, further comprising determining, by the processing system, the time period based on a transaction channel through which the request for the transaction is initiated.

4. The method of claim 3, wherein the transaction channel is one of a retail transaction channel, an online transaction channel, or a contact center transaction channel.

5. The method of claim 1, wherein the time period is an amount of time less than a time for completing the transaction.

6. The method of claim 1, wherein canceling the transaction further comprises routing, by the processing system, the response message received from the communication device associated with the user account to a transaction processing system.

7. The method of claim 1, wherein the transmitting the alert message to the communication device associated with the user account is via short message service (SMS) or push notification.

8. A device, comprising:
  a processing system including a processor; and
  a memory that stores executable instructions that, when executed by the processing system, facilitate performance of operations, the operations comprising:
    receiving a request from a transaction processing system for a transaction associated with a user account of a communication service provider, wherein the user account is associated with a communication device;
    transmitting a prompt to the transaction processing system to perform an authentication step for the transaction, wherein the authentication step requires access to the communication device associated with the user account;
    receiving an indication from the transaction processing system that the communication device associated with the user account is not available for the authentication step due to being lost or stolen; and
    responsive to the receiving the indication that the communication device associated with the user account is not available for the authentication step due to being lost or stolen:
      transmitting an alert message to the communication device associated with the user account, wherein the alert message includes a personal identification number (PIN);
      monitoring for a response message from the communication device associated with the user account;
      determining whether the response message from the communication device associated with the account is received within a time period and includes the PIN;
      canceling the transaction responsive to the determining that the response message from the communication device associated with the user account is received within the time period and includes the PIN; and
      completing the transaction responsive to the determining that the response message from the communication device associated with the user account is not received within the time period or does not include the PIN.

9. The device of claim 8, wherein the operations further comprise generating the PIN responsive to the receiving the indication that the communication device associated with the user account is not available for the authentication due to being lost or stolen.

10. The device of claim 8, wherein the operations further comprise determining the time period based on a transaction channel through which the request for the transaction is initiated.

11. The device of claim 10, wherein the transaction channel is one of a retail transaction channel, an online transaction channel, or a contact center transaction channel.

12. The device of claim 8, wherein the time period is an amount of time less than a time for completing the transaction.

13. The device of claim 8, wherein the canceling the transaction further comprises routing the response message received from the communication device associated with the user account to a transaction processing system.

14. The system of claim 8, wherein the transmitting the alert message to the communication device associated with the user account is via short message service (SMS) or push notification.

15. A non-transitory computer readable medium, comprising executable instructions that, when executed by a processing system including a processor, facilitate performance of operations, the operations comprising:
  receiving a request from a transaction processing system for a transaction associated with a user account of a communication service provider, wherein the user account is associated with a communication device;
  transmitting a prompt to the transaction processing system to perform an authentication step for the transaction, wherein the authentication step requires access to the communication device associated with the user account;
  receiving an indication from the transaction processing system that the communication device associated with the user account is not available for the authentication step due to being lost or stolen; and
  responsive to the receiving the indication that the communication device associated with the user account is not available for the authentication step due to being lost or stolen:
    transmitting an alert message to the communication device associated with the user account, wherein the alert message includes a personal identification number (PIN);
    monitoring for a response message from the communication device associated with the user account;
    determining whether the response message from the communication device associated with the account is received within a time period and includes the PIN;
    canceling the transaction responsive to the determining that the response message from the communication device associated with the user account is received within the time period and includes the PIN; and
    completing the transaction responsive to the determining that the response message from the communication device associated with the user account is not received within the time period or does not include the PIN.

16. The non-transitory computer readable medium of claim 15, completing the transaction responsive to the determining that the response message from the communication device associated with the user account is not received within the time period or does not include the PIN.

17. The non-transitory computer readable medium of claim 15, wherein the operations further comprise determining the time period based on a transaction channel through which the request for the transaction is initiated.

18. The non-transitory computer readable medium of claim 17, wherein the transaction channel is one of a retail transaction channel, an online transaction channel, or a contact center transaction channel.

19. The non-transitory computer readable medium as defined in of claim 15, wherein the time period is an amount of time less than a time for completing the transaction.

20. The non-transitory computer readable medium of claim 15, wherein the canceling the transaction further comprises routing the response message received from the communication device associated with the user account to a transaction processing system.

* * * * *